US012607568B2

(12) United States Patent
Weise et al.

(10) Patent No.: US 12,607,568 B2
(45) Date of Patent: Apr. 21, 2026

(54) APPARATUS AND METHOD FOR OPTICAL INSPECTING THREE OR MORE SIDES OF A COMPONENT

(71) Applicant: BESI SWITZERLAND AG, Steinhausen (CH)

(72) Inventors: Ralf Weise, Steinhausen (CH); Katharina Schmeing, Steinhausen (CH); Rudolf Grüter, Steinhausen (CH); Marco Hug, Steinhausen (CH)

(73) Assignee: Besi Switzerland AG, Steinhausen (CH)

( * ) Notice: Subject to any disclaimer, the term of this patent is extended or adjusted under 35 U.S.C. 154(b) by 0 days.

(21) Appl. No.: 18/559,056

(22) PCT Filed: May 4, 2022

(86) PCT No.: PCT/IB2022/054095
§ 371 (c)(1),
(2) Date: Nov. 5, 2023

(87) PCT Pub. No.: WO2022/234465
PCT Pub. Date: Nov. 10, 2022

(65) Prior Publication Data
US 2024/0230552 A1    Jul. 11, 2024

(30) Foreign Application Priority Data
May 5, 2021    (CH) ..................................... 00507/21

(51) Int. Cl.
*G01N 21/88*        (2006.01)
*G01N 21/95*        (2006.01)

(52) U.S. Cl.
CPC ..... *G01N 21/8806* (2013.01); *G01N 21/9503* (2013.01); *G01N 2021/8841* (2013.01);
(Continued)

(58) Field of Classification Search
CPC ...... H01S 5/143; H01S 5/141; G02B 6/29316
See application file for complete search history.

(56) References Cited

U.S. PATENT DOCUMENTS 10,324,044 B2    6/2019    Marivoet et al.
10,973,158 B2    4/2021    Bilewicz et al.
(Continued)

FOREIGN PATENT DOCUMENTS

WO        2015/076753 A1    5/2015
WO        2021/058653 A1    4/2021

OTHER PUBLICATIONS

Arnold Group: TAG lens (princeton.edu), "Tunable acoustic gradient index of refraction lens", spikelab.mycpanel.princeton.edu/research/TAG_lens.html (accessed Feb. 9, 2024).
(Continued)

*Primary Examiner* — Tony Ko

(74) *Attorney, Agent, or Firm* — HULTQUIST, PLLC; Steven J. Hultquist

(57)        ABSTRACT

The inventions describes an apparatus for inspection of a component comprising an adjustable optical element for image detection in two steps—with focus on the second (or bottom) face of the component and with a focus on the sides. This allows the degree of image degradation in one or more of the images to be reduced.

16 Claims, 12 Drawing Sheets

(52) U.S. Cl.
CPC . *G01N 21/9505* (2013.01); *G01N 2201/0631* (2013.01); *G01N 2201/0636* (2013.01); *G01N 2201/067* (2013.01)

(56) References Cited

U.S. PATENT DOCUMENTS

| | | | |
|---|---|---|---|
| 2004/0258109 A1 | 12/2004 | Tojo et al. | |
| 2011/0102577 A1 | 5/2011 | Prakapenka et al. | |
| 2015/0138341 A1* | 5/2015 | Amanullah ........ | G01N 21/8806 |
| | | | 348/126 |
| 2022/0337034 A1 | 10/2022 | Lazar et al. | |

OTHER PUBLICATIONS

Optotune_2023, "Focus tunable lenses", www.optotune.com/focus-tunable-lenses (accessed Feb. 9, 2024).

* cited by examiner

APPARATUS AND METHOD FOR OPTICAL INSPECTING THREE OR MORE SIDES OF A COMPONENT

CROSS-REFERENCE TO RELATED APPLICATIONS

This application is a U.S. national phase under the provisions of 35 U.S.C. § 371 of International Patent Application No. PCT/IB2022/054095 filed May 4, 2022, which in turn claims priority under 35 U.S.C. § 119 of Switzerland Patent Application No. 00507/21 filed May 5, 2021. The disclosures of all such applications are hereby incorporated herein by reference in their respective entireties, for all purposes.

TECHNICAL FIELD

Traditionally, component handling and processing systems and apparatus have performed quality control by optical inspecting a number of samples after completion of the handling and processing. However, this means that correcting and preventing defects may be less efficient because a larger number of components may need to be reworked.

PRIOR ART

More recently, inspection processes have been developed for components, such as dies, to not only inspect the bottom face, but also to inspect one or more sides to detect defects, such as cracks, which are frequently present on faces and/or sides due to mechanical processing, such as the dicing used to separating and singulate dies from each other and the wafer.

U.S. Pat No. 10,324,044 B2 describes an apparatus, a method and a computer program product for defect detection in work pieces is disclosed. At least one light source is provided, and the light source generates an illumination light of a wavelength range at which the work piece is transparent. A camera images the light from at least one face of the work piece on a detector of the camera by means of a lens. A stage is used for moving the work piece and for imaging the at least one side or face of the semiconductor device completely with the camera.

Known inspection systems often have significant drawbacks when inspecting five or more sides (for example, four sides and a top or bottom face of a singulated component or semiconductor device.

For example:

inspecting more sides or faces usually decreases throughput;

the differing focus between the sides and the bottom face may affect image quality;

image resolution of a face and one or more sides usually requires a relatively large field of view which may limit the pixel resolution that can be used;

and non-critical contamination may be indistinguishable from real defects due to insufficient resolution.

Inline inspection is preferred, but because each component is inspected, the impact on throughput may need to be reduced by limiting or eliminating one or more inspection steps.

CONTENT OF THE INVENTION

An object of the invention is to provide a component-inspection apparatus which can accurately detect side defects and also internal defects in singulated components without major loss of throughput.

In a first aspect of the invention, a preferably optical component-inspection apparatus is provided according to claim 1.

By modifying one or more optical paths, image detection may be performed in two steps—with focus on the second (or bottom) face of the component and with a focus on the sides. This allows the degree of image degradation in one or more of the images to be reduced.

Particularly advantageous is the use of a liquid lens as an adjustable optical element, which allows the shape and focus to be changed electrically. Refocusing with a liquid lens may take only tens of milliseconds, which is typically quicker than any complex mechanical component movement can be performed. Focusing time of approximately 20 ms are possible.

In a further aspect of the invention, a component-inspection apparatus is provided according to claim 6.

Using a third optical reflector may be advantageous as it provides a higher degree of freedom in determining the disposition of the second image detector in the apparatus.

In a further aspect of the invention, a component-inspection apparatus is provided according to claim 7.

Depending on the degree of deviation from a square component, it may be advantageous to modify one or more focus parameters to optimize the image focus of the sides.

In a still further aspect of the invention, a component-inspection apparatus is provided according to claim 16.

The use of four mirrors allows a single image to be made of one face 660 and four sides 610, 620, 640, 640.

BRIEF DESCRIPTION OF DRAWINGS

Further advantages and features of the present invention are shown in the following figures, namely.

DETAILED DESCRIPTION OF THE INVENTION

Figure 1A:
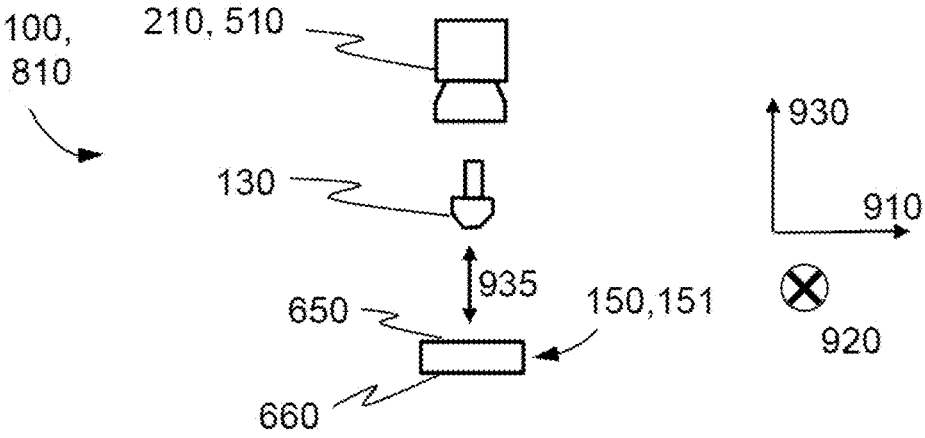
FIGS. 1A and 1B show schematic views of a first inspection position comprised within a component inspection apparatus.

In the figures, a first axis 910, a second axis 920 and a third 930 axis are depicted to make it easier for the skilled person to relate the different views and different parts together. The first axis 910 is substantially perpendicular to the second axis 920, and the third axis 930 is substantially perpendicular to both the first axis 910 and the second axis 920.

It may be convenient to consider the first axis 910 to be in an X direction, the second axis 920 in a Y direction and the third axis 930 in a Z direction.

Technically, the first 910 and second 920 axis are fully interchangeable for the embodiments in this disclosure. Many functions which operate along the direction of the third axis 930 may be interchanged with an equivalent operation along the direction of the first axis 910. Many functions which operate along the direction of the third axis 930 may be interchanged with an equivalent operation along the direction of the second axis 920.

Figure 1B:
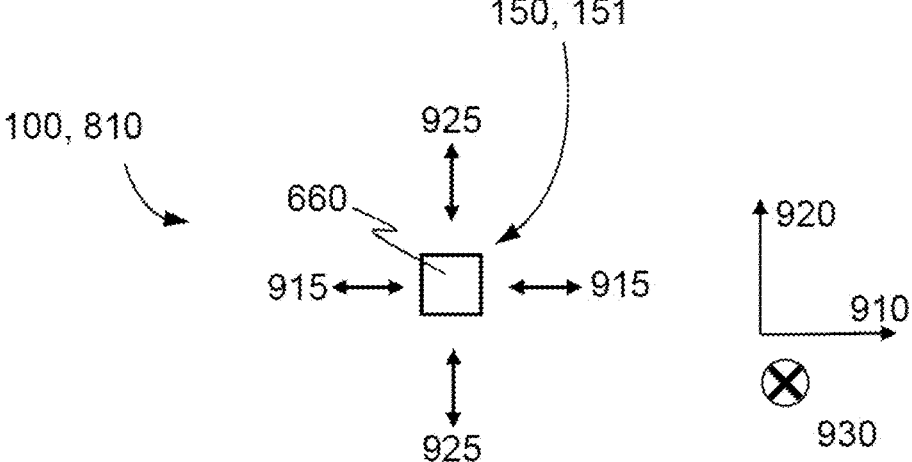

FIGS. 1A and 1B show schematic views of a first inspection position 810 comprised within a component inspection apparatus, such as a die inspection apparatus 100. Optionally, the die inspection apparatus 100 may be comprised in a device configured and arranged for handling and/or processing dies, such as a die bonder. Alternatively, any other object having three sides/faces or more, such as a semiconductor package, a chip, an integrated circuit or a substrate, may be inspected.

FIG. 1A depicts a view lying in the plane comprising the first axis 910, nominally indicated as having a positive direction from left to right, and the third axis 930, nominally indicated as having a positive direction from bottom to top. The second axis 920 is nominally indicated as having a positive direction going into the page.

A die attachment head 130, such as a die bonder head, is provided which may move 935 positively and negatively along the third axis 930. A die 150, 151 is positioned further along the third axis 930, such that the die attachment head 130 may move 935 towards or away from the die 150, 151 along the third axis 930.

Optionally, the die attachment head 130 may be configured and arranged, after attachment to the die 150, 151, to rotate (not depicted) around the third axis 920.

FIG. 1A further depicts a first image detector 510, configured and arranged to capture an image of at least a portion of the first face 650 of the die 150, 151. Optionally, a first light source 210 may be provided. Optionally, as depicted, it may be integrated with the first image detector 510. Additionally or alternatively a light source may be positioned at any convenient position that allows at least a portion of light to be reflected and/or scattered from at least a portion of the first face 650 of the die 150, 151. A degree of scattering may also occur. Optionally, one or more optical elements, such as an objective lens, may be comprised in the first image detector 510.

FIG. 1B depicts a further view of the first inspection position 810 lying in the plane comprising the first axis 910, having a positive direction from left to right, and the second axis 920, having a positive direction from bottom to top. The third axis 930 has a positive direction going into the page.

The die 150, 151 is depicted such that the second die face 660 is facing the front of the figure. The die attachment head 130 is hidden in FIG. 1B. For clarity, the first light source 210 and first image detector 510 are not depicted in FIG. 1B. The view may also be described as looking along the third axes 930 in a positive direction towards the bottom face 660 of the die 150, 151. For clarity, only an approximately square die 150 has been depicted, but technically this embodiment will also operate with an approximately rectangular die 151.

The die attachment head 130 is configured and arranged, after attachment to the die 150, 151, to move 925 in the direction of the second axis 920. Optionally, the die attachment head 130 may be configured and arranged, after attachment to the die 150, 151 to move 915 in the direction of the second axis 920.

Optionally, the die attachment head 130 may be configured and arranged, after attachment to the die 150, 151, to rotate (not depicted) around the first axis 910. Additionally, or alternatively, the die attachment head 130 may be configured and arranged, after attachment to the die 150, 151, to rotate (not depicted) around the second axis 920.

Figure 1C:
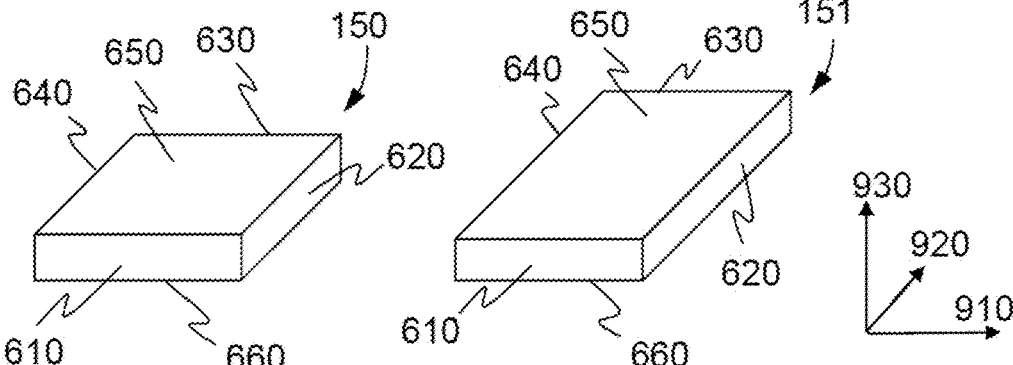
FIG. 1C depicts a perspective view of two different types of component—an approximately square component and an approximately rectangular component.

FIG. 1C depicts a perspective view of two different types of die—an approximately square die 150 and an approximately rectangular die 151. This may be described as the die to be inspected having an approximately square or approximately rectangular longitudinal die cross-section in the plane comprising the first 910 and second 920 axes. In other words, during inspection as depicted in the figures, the die has an approximately square 150 or an approximately rectangular transverse apparatus cross-section in the plane comprising the first 910 and 920 axes.

The approximately square die 150, comprises a first die face 650 extending approximately along the first axis 910 and second 920 axis. The dimensions along the first axis 910 may be considered to be a width, and the dimensions along the second axis 920 may be considered a length. The die 150 is described as "square" because the extent (or dimensions) along the first 910 and second 920 axes are approximately the same.

Due to the typical orientation of the apparatus, the first face 650 may be considered to be a top face. The die further comprises a second face 660 which is hidden in FIG. 1C, which may be considered a bottom face.

In general, the first face 650 and the second face 660 are on opposite faces of the die 150. Technically, the first face 650 and second face 660 of the die 150 are fully interchangeable in the embodiments in this disclosure.

The terms top and bottom may be considered to be less interchangeable if the first face 650 and second face 660 of the die 150 are differently configured and/or an operation is performed on only one face. For example, if the attachment head 130 is a die bonder, then attachment to the die (picking) is made on the top face 650 of the die 150, which has been processed using semiconductor techniques, and the bottom face 660 of the die 150 is configured and arranged for attaching (placing) to a further substrate during bonding.

The square die 150 also extends along the third axis 930. The dimensions along the third axis 930 may be considered to be a height or thickness. The square die 150 comprises a first side 610, a second side 620, a third side 630 (hidden in FIG. 1C) and a fourth side 640 (hidden in FIG. 1C).

In general, a face is a planar surface bounding a solid, and a side is a planar face bounding a solid that is adjacent to a face. A side may also be described as an edge.

The terms "face" and "side" are used in this disclosure as these will be familiar to the skilled person.

As depicted, the first side 610 and the third side 630 are on opposite sides of the die 150; and the second side 620 and the fourth side 640 are on different opposite sides of the die 150. The first side 610 is adjacent to the second side 620, and the third side 630 is adjacent to the fourth side 640. The first side 610, the second side 620, the third side 630 and the fourth side 640 are disposed adjacent to the first face 650 and the second face 660. Technically, references to the first side 610, the second side 620, the third side 630 and the fourth 640 sides are fully interchangeable in the embodiments in this disclosure.

Due to the typical orientation of the apparatus, the first side 610, the second side 620, the third side 630 and the fourth 640 faces may be considered to be respectively a first side 610, a second side 620, a third side 630, and a fourth side 640. The first side 610, the second side 620, the third side 630 and the fourth 640 sides are disposed adjacent to the top face 650 and the bottom face 660. Typically, dies (and semiconductor packages and components) are planar, with a thickness much less than the width and length. Dies are depicted in the figures as having two faces and four sides (or edges). However, the skilled person will realize that the embodiments described in this disclosure operating with a square die 150 or rectangular die 151 may be configured and arranged to operate with dies having very different relative dimensions, including cube shapes and approximate cube shapes. For inspection using the embodiments described in this disclosure, the die is considered to comprise five or more planar surfaces, comprising faces, sides, and any combination thereof.

In the terms of this disclosure, a die may be considered square if the inspection in a second inspection position (depicted in FIGS. 2A and 2B) may be performed without significant change to one or more focus settings at both a first and a second orientation, wherein the second orientation is reached after rotating the die 90 or 270 degrees (or a multiple of 90 and/or 270 degrees) around the third axis 930 from the first orientation.

For example, a die may be considered square if the difference in the position of the die edges at both the first and second orientations is less than the depth of field of the imaging optics.

The approximately rectangular die 151 is described as "rectangular" because the extent (or dimensions) along the first axis 910 is less than the extent along the second axis 920.

In some technical fields, rectangle may be considered a quadrilateral with four right angles. In those cases, the use of rectangle in this disclosure should be considered to mean oblong rectangle, extended rectangle, and/or non-square rectangle.

The rectangular die 151 is the same as the square die except for the relative dimensions.

In the terms of this disclosure, a die may be considered rectangular if the inspection in the second inspection position (depicted in FIGS. 2A and 2B) cannot be performed at both a first and a second orientation without significant changes to one or more focus settings, wherein the second orientation is reached after rotating the die 90 or 270 degrees (or a multiple of 90 and/or 270 degrees) around the third axis 930 from the first orientation. In other words, the inspection at the first orientation is not repeatable at the second orientation without significant changes to one or more focus settings.

Prior to inspection at the first inspection position 810, the die 150, 151 is transported (not depicted) to the first inspection position 810. This is a position where at least a portion of the first face 650 is positioned within imaging range of the first image detector 510. If the inspection apparatus 100 is comprised in a die bonder, for example, the die 150, 151 may still be on the wafer during inspection at the first inspection position 810.

Optionally, the first light source 210 is activated whereby at least a portion of light of a suitable composition is reflected and/or scattered from the first face 650 of the die 150, 151 towards the first image detector 510. A degree of scattering may also occur.

One or more inspection images are then made of at least a portion of the first face 650 of the die 150, 151.

After capturing the images at the first inspection position 810, the die attachment head 130 is moved 935 in the negative direction of the third axis 930 until it reaches the top face 650 of the die 150, 151. The die 150, 151 is attached to the die attachment head 130 and moved 925 in the direction of the second axis 920 to the second inspection position (depicted in FIGS. 2A and 2B).

Optionally, the die 150, 151 may also be moved 915 in the direction of the first axis 910. Additionally or alternatively, the die 150, 151 may be moved 935 in the direction of the third axis 930.

Figure 2A:
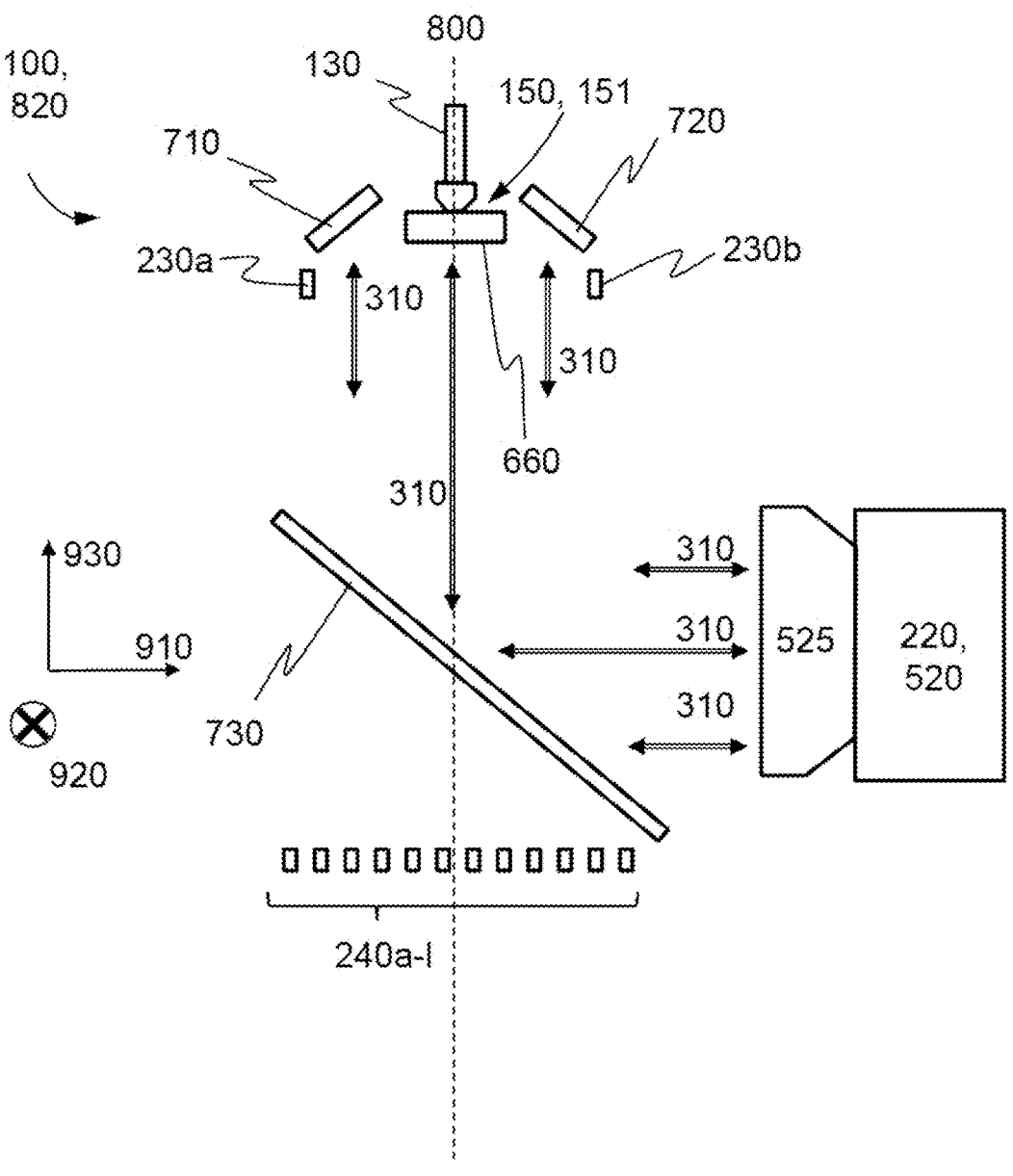
FIGS. 2A and 2B show schematic views of a second inspection position comprised within the component inspection apparatus.
Figure 2B:
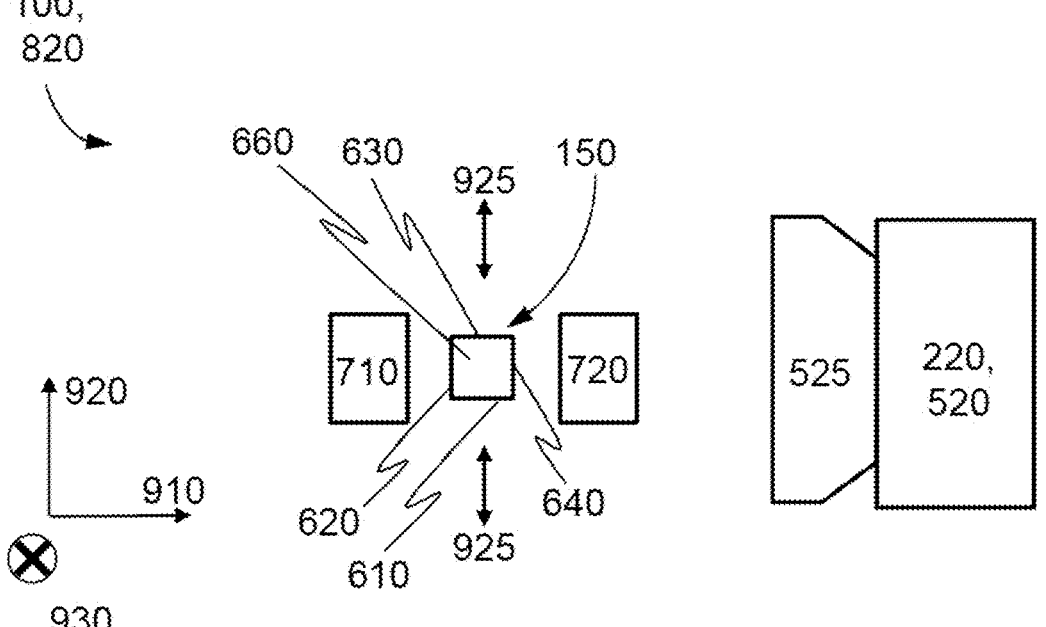

FIGS. 2A and 2B show schematic views of a second inspection position 820 comprised within the die inspection apparatus 100. The second inspection position 820 may also be described as an edge (or side) inspection position 820.

FIG. 2A depicts a view lying in the plane comprising the first axis 910, with a positive direction from left to right, and the third axis 930, with a positive direction from bottom to top. The second axis 920 has a positive direction going into the page. It schematically represents a longitudinal cross-section through the die inspection apparatus 100 at the second inspection position 820.

In the second inspection position 820, the die 150, 151 is positioned between a first optical reflector 710 and a second optical reflector 720, whereby two opposite sides 610, 630 are positioned to be facing, respectively, the first 710 and second 720 optical reflectors. The die 150, 151 is further positioned on an optical axis 800, which extends in the direction of the third axis 930.

Optionally, the die attachment head 130, may be used to retain the die 150, 151 in the correct position.

The second inspection position 820 further comprises an optional third optical reflector 730, positioned further along the optical axis 800 in a negative direction of the third axis 930, configured and arranged to image the second face (or bottom face) 660 of the die 150, 151. For example, the third optical element 730 may be a mirror or a beam deflector. This may be advantageous as it provides a higher degree of freedom in determining the disposition of the second image detector 520 in the apparatus 100, 110. The third optical reflector 730 is preferably highly reflective for the wavelength used for illumination. Additionally, the surface quality is preferably high enough that the image quality of the inspection is not significantly reduced. For example, a λ/10 First Surface Mirror from Edmund Optics: www.edmundoptics.com/f/lambda10-first-surface-mirrors/13759/—with a surface flatness of λ/10 and a surface quality of 20-10.

Optionally, a beam splitter or semi-transparent mirror may be used as described below, if one or more light sources 240 are provided at positions further along the third axis 930 in a negative direction. This may also be described as providing illumination 240 underneath the third optical reflector 730. In such a case, the third optical reflector 730 may be further configured and arranged to couple in these additional light sources 240 to provide a degree of tilt compensation illumination. The beam splitter is preferably optimised for the wavelength used for illumination. Additionally, the surface quality is preferably high enough that the image quality of the inspection is not significantly reduced. For example, a Plate Beamsplitter from Edmund Optics: www.edmundoptics.com/f/plate-beamsplitters/ 12424/—with a surface quality of 80 to 50, and a surface flatness of 4 to 6 λ.

Optionally, instead of including a third optical reflector 730 in the apparatus 100, the second image detector 520 may be disposed further along the third axis 930 in the negative direction from the die 150, 151.

If the ambient light is not sufficient, at least one illumination is required—at least one first light source 210 or at least one fourth light source 240.

The second inspection position 820 further comprises a second image detector 520, configured and arranged to capture an image of at least a portion of the second face 660 of the die 150, 151. The second image detector 520 comprises a second light source 220, configured and arranged, in cooperation with the third optical reflector 730, to provide direct illumination of the second face 660 of the die 150, 151.

The second image detector 520 may also be described as a direct image detector 520—in other words, a detector suitable for imaging using a further light source. The second light source 220 may also be described as a further light source 220—in other words, a light source suitable for producing a direct light.

For example, as depicted, light from the second light source 220 is directed 310 towards the third optical reflector 730 in the negative direction of the first axis 910. In other words, the second light source 220 provides, in use, a second illumination beam 310, which may also be described as a direct illumination beam 310.

For example, as depicted, the third optical reflector 730 is positioned at approximately forty-five degrees to the optical axis 800 whereby the light from the second light source 220 is received 310, and directed substantially parallel to the optical axis 800 towards the second face 660 of the die 150, 151. The returning light from the second face 660 is received 310 substantially parallel to the optical axis 800, and directed towards 310 the second image detector 520.

Direct illumination of the second face 660 in the context of this disclosure means that light from the second light source 220 is received by the third optical reflector 730 and directed in the positive direction of the third axis 930 towards the second face of the die 150, 151, substantially parallel 310 to the optical axis 800. The reflected and/or scattered light 310 from the second face 660 of the die 150, 151 is directed along the third axis 930 in a negative direction, substantially parallel to the optical axis 800, and coupled into the second image detector 520 by the third optical reflector 730.

In this example, the reflected and/or scattered light coupled into the image detector comprises reflected and/or scattered direct illumination light. Additionally, or alternatively, if one or more alternative light sources are used to illuminate the second face 660, the reflected and/or scattered light coupled into the image detector may comprise reflected and/or scattered light from one or more alternative sources.

Optionally, one or more optical elements, such as an objective lens, may be comprised in the second image detector 520. It may be advantageous to configure and arrange the second image detector 520 configured and arranged to produce an orthographic image of:
at least a portion of the second face 660;
at least a portion of the first side 610, 620;
at least a portion of the second side 630, 640; or
any combination thereof.

For example, the objective may be configured and arranged to be telecentric.

The first 710 and second 720 optical reflectors are positioned along the first axis 910, on opposite sides of the die 150, 151, each positioned to face one of the die sides 610, 630 respectively.

The first 710 and second 720 optical reflectors are each configured and arranged, in cooperation with the third optical reflector 730, to image at least a portion of one of the sides 610, 630. For example, the first 710 and/or second 720 optical elements may be a mirror or a beam deflector.

The third optical reflector 730 is further configured and arranged to image, in cooperation with the first 710 and second 720 optical reflectors, at least a portion of each of the two sides 610, 630.

The second image detector 520 is further configured and arranged to capture an image of at least a portion of each of the two sides 610,630. The second image detector 520 is further configured and arranged, in cooperation with the third optical reflector 730, to provide direct illumination of each of the two sides 610, 630.

For example, as depicted, the third optical reflector 730 is positioned at an angle of approximately forty-five degrees to further direct light from the second light source 220 towards the first 710 and second 720 optical reflectors, substantially parallel to the optical axis 800. The first 710 and second 720 optical reflectors direct light from the third optical reflector 730 to each of the two sides. The returning light from each of the sides is received by the first optical reflector 710 or the second optical reflector 720, and directed 310 towards the third optical reflector 730 substantially parallel to the optical axis 800. The returning light from the third optical reflector 730 is directed 310 towards the second image detector 520.

Direct illumination of one or more sides in the context of this disclosure means that light from the second light source 220 is received by the third optical reflector 730 and also directed in the positive direction of the third axis 930 towards the first 710 and/or second 720 optical reflectors, substantially parallel 310 to the optical axis 800.

The reflected and/or scattered light 310 from the first 710 and/or second 720 optical reflectors is directed along the third axis 930 in a negative direction, substantially parallel to the optical axis 800, and coupled into the second image detector 520 by the third optical reflector 730.

In this example, the reflected and/or scattered light coupled into the image detector comprises reflected and/or scattered direct illumination light. Additionally or alternatively, if one or more alternative light sources are used to illuminate one or more die sides 610, 630, the reflected and/or scattered light coupled into the image detector may comprise reflected and/or scattered light from one or more alternative sources.

The second inspection position 820 may further comprise one or more optional third light sources 230a, 230b, positioned between the second face 660 of the die 150, 151 and the third optical reflector 730. The third light source 230a, 230b is configured and arranged to provide indirect illumination of the second face 660 of the die 150, 151 to help observe, for example, dust particles.

The angle may be predetermined and/or controlled to optimise the desired imaging of particles. Additionally, or alternatively, the distance away from the second face 660 of the die 150, 151 may be predetermined and/or controlled to receive sufficient light energy on the second face 660. Additionally, or alternatively, the wavelengths emitted may be predetermined and/or controlled to optimise the desired imaging of particles.

If more than one third light source 230a, 230b is provided, the plurality of third light sources 230a, 230b may be configured and arranged identically, similarly and/or differently. The plurality of third light sources 230a, 230b may be used simultaneously, alternately and/or occasionally.

For example, as depicted in FIG. 2A, two LED's or LED bars 230a, 230b may be used, positioned symmetrically about the second face 660 of the die 150, 151 under inspection. For example, as depicted, with one LED/LED bar 230a, 230b on each side of the optical axis 800—as depicted, the "a" source is on the observer's left of the optical axis 800 and the "b" source is on the observer's right of the optical axis 800.

In the context of this disclosure, indirect illumination means being positioned proximate to the optical axis 800 and proximate to the second surface 660, whereby at least a portion of the light will be directed towards the second face 660 at relatively oblique angles.

Figure 5A:
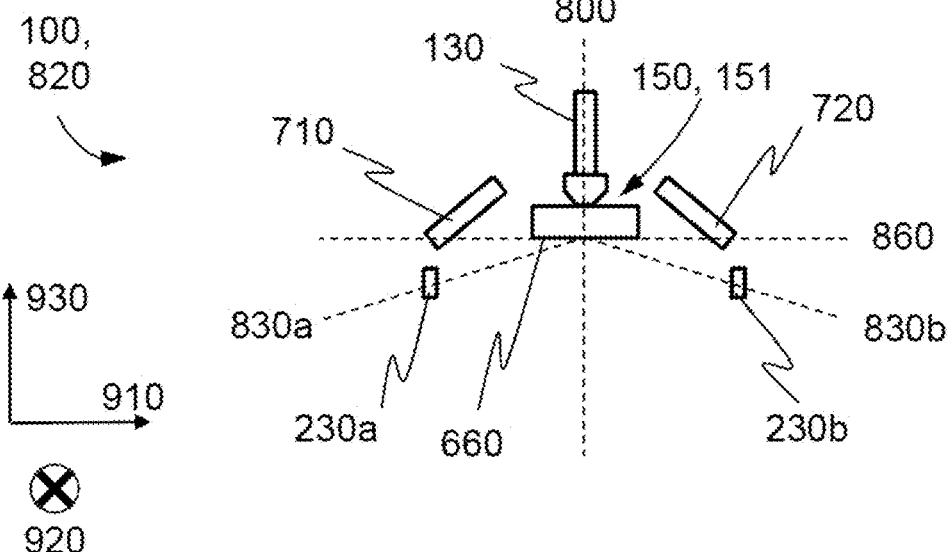
FIGS. 5A and 5B show further schematic views of a second inspection position comprised within the die inspection apparatus.

FIG. 5A depicts selected elements and features of the die inspection apparatus 100 depicted in FIG. 2A. For clarity, a number of elements and features of FIG. 2A related to the further light source 220 and the second image detector 520 are not depicted.

The die 150, 151 is positioned on the optical axis 800, which extends in the direction of the third axis 930. A longitudinal cross-section through a first plane 860 is depicted, comprising the second (or bottom) face 660 of the die 150, 151 and intersecting with the optical axis 800.

A longitudinal cross-section through a second plane 830a is depicted, comprising (in use) a portion of light from the "a" third light source 230a. The second plane 830a intersects with the "a" third light source 230a, with the first plane 860 and with the optical axis 800. During use, a portion of light from the "a" third light source 230a passes along the second plane 830a, intersecting with the second face 660, providing indirect illumination of the second face 660. In a longitudinal cross-section through the first plane 860 and the second plane 830a, the angle between the first plane 860 and the second plane 830a is 45 degrees or less. It may be advantageous to predetermine and/or control the angle in a longitudinal cross-section between the first plane 860 and the second plane 830a to be in the range of approx. 20 degrees to approx. 45 degrees.

A longitudinal cross-section through a third plane 830b is depicted, comprising (in use) a portion of light from the "b" third light source 230b. The third plane 830b intersects with the "b" third light source 230b, with the first plane 860 and with the optical axis 800. During use, a portion of light from the "b" third light source 230b passes along the third plane 830b, intersecting with the second face 660, providing indirect illumination of the second face 660. In a longitudinal cross-section through the first plane 860 and the third plane 830b, the angle between the first plane 860 and the third plane 830b is 45 degrees or less. It may be advantageous to predetermine and/or control the angle in a longitudinal cross-section between the first plane 860 and the third plane 830b to be in the range of approx. 20 degrees to approx. 45 degrees.

The light reflected and/or scattered back from the second face 660 comprises light provided as direct illumination and/or light provided as indirect illumination. This light is reflected and/or scattered along the third axis 930 in a negative direction, substantially parallel to the optical axis 800, and coupled into the second image detector (not depicted) by the third optical reflector 730. At least the following illumination modes may be used for inspection:
  a direct illumination of the second face 660 is enabled, indirect illumination 230a-b of the second face 660 is not enabled, reflected and/or scattered direct illumination 310 is coupled into the second image detector; or
  a direct illumination of the second face 660 is enabled, indirect illumination 230a-b of the second face 660 is enabled, reflected and/or scattered direct illumination 310 and reflected and/or scattered indirect illumination 230a-b are coupled into the second image detector; or
  a direct illumination of the second face 660 is not enabled, indirect illumination 230a-b of the second face 660 is enabled, reflected and/or scattered indirect illumination 230a-b is coupled into the second image detector.

These modes may be further combined with the illumination modes described below using tilt compensation illumination.

The second inspection position 820 may further comprise one or more optional fourth light sources 240a-f, positioned further along the third axis 930 in a negative direction from the third optical reflector 730. This may also be described as providing illumination 240a-f underneath the third optical reflector 730.

In such a case, the third optical reflector 730 may be further configured and arranged to couple in the fourth light source 240a-f to provide a degree of tilt compensation illumination, for example, by being a beam splitter.

In the context of this disclosure, tilt compensation illumination comprises a plurality of light sources, providing a larger set of angles of incidence on the die faces and/or sides than the direct illumination whereby uneven parts of the die faces and/or sides are illuminated.

The tilt compensation illumination may be configured and arranged to provide predetermined and/or controlled angles of incidence of light from the one or more fourth light sources 240a-f onto one or more sides of the die. During dicing processes, some die sides and edges may be cut unevenly. To provide a satisfactory illumination of such uneven die sides (or sides), tilt compensation illumination may be predetermined and/or controlled to provide incidence angles of the side illumination which correspond to the expected side surface angles which appear on the cut die side.

The incidence angles required may be different for different types of die, different manufacturers, different die dicing processes, etc. The incidence angles may be determined by measurement, estimation, simulation or any combination thereof.

For example, as depicted, a plurality of LED's or LED bars 240a-f extending along in the direction of the first axis 910. Six LED's/LED bars 240a-f may be suitable, for example.

Figure 5B:
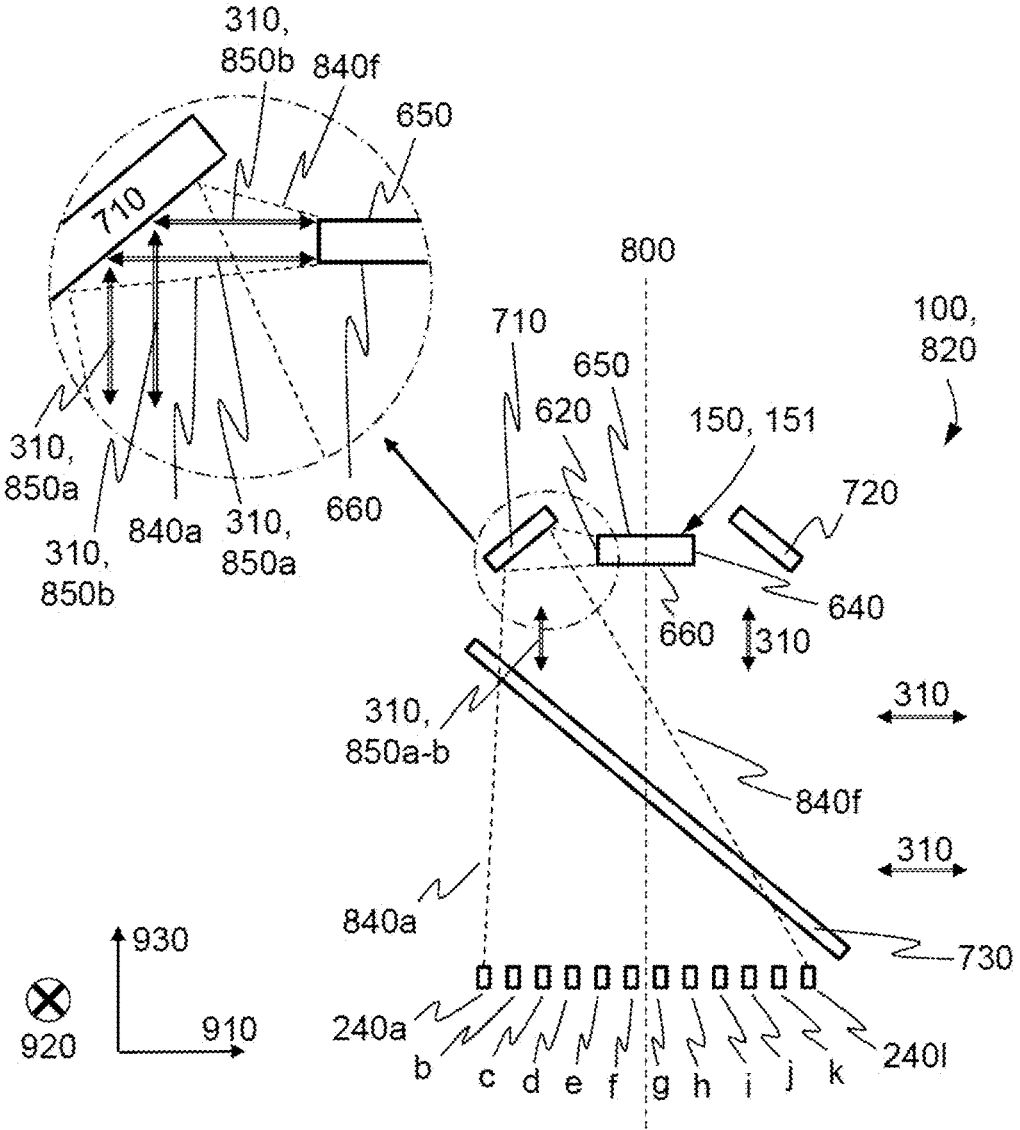

FIG. 5B depicts selected elements and features of the die inspection apparatus 100 depicted in FIG. 2A. For clarity, a number of elements and features of FIG. 2A related to the further light source 220, the direct illumination of the second face 660, the second image detector 520 and the one or more third light sources 230a, 230b are not depicted. The one or more fourth light sources 240a-f comprise six LED's/LED bars 240a, 240b, 240c, 240d, 240e, 240f—as depicted, the "a" source is on the observer's left of the optical axis 800 and the "f" source is in the observer's right of the optical axis 800. The die 150, 151 is positioned on the optical axis 800, which extends in the direction of the third axis 930.

For clarity, light from the one or more fourth light sources 240a-f is only shown, in use, passing through the third optical reflector 730 towards the first optical reflector 710 and being directed towards the second side 620 of the die 150, 151. The skilled person will realise that, in use, light 240a-f may also pass similarly through the third optical reflector 730 towards the second optical reflector 720 and be directed by the second optical reflector 720 towards the fourth side 640 of the die 150, 151.

For clarity, details of the direct illumination have been limited to arrows 310 indicating direct illumination of one or more sides in the main part of FIG. 5B. However, in the enlargement (depicted on the left), more details are depicted of the illumination of the second side 620.

Light 310 from the second light source (not depicted) is received by the third optical reflector 730 and directed 310 in the positive direction of the third axis 930 towards the first 710 and/or second 720 optical reflectors, substantially parallel 310 to the optical axis 800.

A longitudinal cross-section through a fourth plane 840a is depicted, comprising (in use) a portion of light from the "a" fourth light source 240a. The fourth plane 840a intersects with the "a" fourth light source 240a, with the first reflector 710 and the second side 620. During use, a portion of light from the "a" fourth light source 240a passes along the fourth plane 840a, through the third optical reflector 730, reflected and/or scattered by the first reflector 710 and intersecting with the second side 620, providing tilt compensation illumination of the second side 620 close to the second face 660.

A longitudinal cross-section through a fifth plane 840f is depicted, comprising (in use) a portion of light from the "f" fourth light source 240f. The fourth plane 840f intersects with the "f" fourth light source 240f, with the first reflector 710 and the second side 620. During use, a portion of light from the "f" fourth light source 240f passes along the fourth plane 840f, through the third optical reflector 730, reflected and/or scattered by the first reflector 710 and intersecting with the second side 620, providing tilt compensation illumination of the second side 620 close to the first face 660.

A longitudinal cross-section through a sixth plane 850a is depicted, comprising (in use) a portion of light from further light source. During use, a portion of light 310 from the further light source (not depicted) is reflected and/or scattered from the third optical reflector 730 along the sixth plane 850a, which intersects with the first optical reflector 710. This portion of light 310 is reflected and/or scattered by the first optical reflector 710 along the sixth plane 850a to intersect with the second side 620, providing direct illumination of the second side 620 close to the second face 660.

A longitudinal cross-section through a seventh plane 850b is depicted, comprising (in use) a portion of light from further light source. During use, a portion of light 310 from the further light source (not depicted) is reflected and/or scattered from the third optical reflector 730 along the seventh plane 850b, which intersects with the first optical reflector 710. This portion of light 310 is reflected and/or scattered by the first optical reflector 710 along the seventh plane 850b to intersect with the second side 620, providing direct illumination of the second side 620 close to the first face 650.

The light reflected and/or scattered back from the second side 620 comprises light provided as direct illumination and/or light provided as tilt compensation illumination. This light is reflected and/or scattered from the first 710 optical reflector and directed along the third axis 930 in a negative direction, substantially parallel to the optical axis 800, and coupled into the second image detector (not depicted) by the third optical reflector 730. At least the following illumination modes may be used for inspection: a direct illumination of the second side 620 is enabled, tilt compensation illumination 240a-f of the second side 620 is not enabled, reflected and/or scattered direct illumination 310 is coupled into the second image detector; or a direct illumination of the second side 620 is enabled, tilt compensation illumination 240a-f of the second side 620 is enabled, reflected and/or scattered direct illumination 310 and reflected and/or scattered tilt compensation illumination 240a-f are coupled into the second image detector; or a direct illumination of the second side 620 is not enabled, tilt compensation illumination 240a-f of the second side 620 is enabled, reflected and/or scattered tilt compensation illumination 240a-f is coupled into the second image detector.

These modes may be further combined with the illumination modes described above using indirect illumination.

In a longitudinal cross-section through the fourth 840a and sixth plane 850a, the angle of incidence of the tilt compensation illumination on the second side 620 is greater than the angle of incidence of the direct illumination on the second side 620. In other words, the angle between the fourth plane 840a and the sixth plane 850a may be 5 degrees or greater. It may be advantageous to predetermine and/or control the angle in a longitudinal cross-section between the fourth plane 840a and the sixth plane 850a to be in the range of approx. 5 degrees to approx. 15 degrees.

In a longitudinal cross-section through the fifth 840b and seventh plane 850b, the angle of incidence of the tilt compensation illumination on the second side 620 is greater than the angle of incidence of the direct illumination on the second side 620. In other words, the angle between the fifth 840b and seventh plane 850b may be 5 degrees or greater. It may be advantageous to predetermine and/or control the angle in a longitudinal cross-section between the fifth 840b and seventh plane 850b to be in the range of approx. 5 degrees to approx. 15 degrees.

FIG. 2B depicts a further view of the second inspection position 820 lying in the plane comprising the first axis 910, having a positive direction from left to right, and the second axis 920, having a positive direction from bottom to top. The third axis 930 has a positive direction going into the page. It schematically represents a transverse cross-section through the die inspection apparatus 100 at the second inspection position 820

This is the view when an approximately square die 150 is inspected at the second inspection position 820. The square die 150 is depicted such that the second die face 660 is facing the front of the figure. The die attachment head 130 is hidden in FIG. 2B. For clarity, the third light source 230a, 230b, the fourth light source 240 and the third optical reflector 730 are not depicted in FIG. 2B. The view may also be described as looking along the third axes 930 in a positive direction towards the bottom face 660 of the square die 150.

The die attachment head 130 is configured and arranged, after attachment to the square die 150 to move 925 in the direction of the second axis 920. A small degree of movement may be provided along the first axis 910 while the die 150 is positioned between the first 710 and second 720 optical reflectors. However, more substantial movement along the first axis 910 is only possible after the square die 150 has been moved from the second inspection position 820, either in the direction 925 of the second axes 920 and/or in the direction of the third axes 930.

The second light source 220 may be activated, providing direct illumination 310 of the second face 660 and each of two die sides, whereby light of a suitable composition is reflected and/or scattered from the second face 660 and each of two die sides, towards 310 the second image detector 520. Both the illumination light and reflected and/or scattered light are redirected by the third optical reflector 730 and either the first optical reflector 710 or the second optical reflector 720.

One or more inspection images are then made of at least a portion of the second face 660 and each of two die sides of the square die 150.

Optionally, the third light source 230*a*, 230*b* may be activated to provide a suitable degree of indirect illumination. Additionally or alternatively, the fourth light source 240 may be activated to provide a suitable degree of tilt compensation illumination. In general, each type of illumination provides a different type of image, for example, an indirect illumination from a third light source 230*a*, 230*b* typically generates an image wherein the edges of the die 150, 151 are distinguishable. For example, a tilt compensation illumination from a fourth light source 240 typically generates an image wherein defects on the sides (or sides) of the die 150, 151 are distinguishable.

Advantageously, two or more types of illumination are provided to allow a large range of inspection types.

The illumination modes and/or focus settings may be predetermined and/or controlled to allow both inspection of surface defects and/or internal defects.

To complete the inspection at the second inspection position 820, the square die 150 may be rotated 90 or 270 degrees (or a multiple of 90 and/or 270) degrees at the second inspection position 820 by rotating the die attachment head 130 around the third axis 930. Additionally, one or more inspection images are made of the other two die sides 610, 630 of the square die 150.

If the distance between the sides of the square die 150, and the first 710 and second 720 optical elements, is too small for safe rotation, the die attachment head 130 may be moved along the third axis 930 in the negative direction. This is away from the first 710 and second 720 optical reflectors. When there is sufficient space, rotate the square die 150 ninety degrees by rotating the die attachment head 130 around the third axis 930. Finally die attachment head 130 may be moved along the third axis 930 in the positive direction whereby the square die 150 is moved back into the second inspection position 820; and/or the die attachment head 130 may be moved along 925 the second axis 920 in either the positive or negative direction. When there is sufficient space, the square die 150 may be rotated approx. ninety degrees (or a multiple of ninety degrees) by rotating the die attachment head 130 around the third axis 930. Finally the die attachment head 130 may be along 925 the second axis 920 whereby the square die 150 is moved back into the second inspection position 820.

For example, the apparatus may be configured and arranged to move the die 150 along the third (or Z) axis 930 in the range of 2 to 10 millimeters.

Additionally or alternatively, the apparatus may be configured and arranged to move the die 150 along the second (or Y) axis 920 in the range of 10 to 60 mm.

In general, safe rotation is possible if the distance between the first 710 and second 720 optical reflectors is greater than the largest diagonal dimension of the die 150 in a plane comprising a face 650, 660 of the die 150.

The amount of rotation is predetermined and/or controlled to allow rotation between one or more sides—for a four-sided die, a rotation of approximately 90 degrees (or a multiple of 90 degrees) is suitable. For dies with a different number of sides, such as hexagonal dies, the amount of rotation may be predetermined and/or controlled to a suitable number of degrees, such as approximately 45 degrees (or a multiple of 45 degrees).

Preferably, the die attachment head 130 is configured and arranged to provide complete rotation, so that any side may be imaged in any order.

Image quality may be further improved by providing a small angular correction around the nominal rotation. For example, a correction in the range of +/−2 degrees with respect to the nominal rotation may be provided.

Optionally, it may be advantageous to determine a rotation error during inspection of the second (or bottom) die face 660—a suitable correction may then be applied when the side (or side) 610, 620, 630, 640 with the rotation error is inspected.

In principle, when generating one or more images using the second image detector 520, there will be three main optical distances from the second image detector 520 to consider for the point of focus. It is assumed that the faces and sides and optical elements in the optical path are optimally aligned and, where appropriate, perpendicular.

The main distances are to the second face 660 of the die 150, to one of the sides of the die 150; and to the other side of the die 150.

The die-inspection apparatus 100 may be configured and arranged to position the die 150 at substantially equal distances to the first 710 and second 720 optical elements. So the main distances then are to the second face 660 of the die 150, and to each side of the die 150.

It may be advantageous to choose a focal point whereby the sides are the most accurately resolved. In some die handling and/or processing systems, side damage may be a greater cause of defects that second surface 660 damage. Inspection of the second face 660 may be acceptable with a poorer illumination and/or more blurry imaging because it may be performed with one image, and without mechanically, electrically or optically changing an optical path length.

It may be advantageous to configure and arrange the die inspection apparatus 100 such that the distance between the sides of the square die 150, and the first 710 and second 720 optical elements, is kept as small as possible. This may further reduce the difference in image quality between the sides and the second surface 660 of the die 150.

Figure 2C:
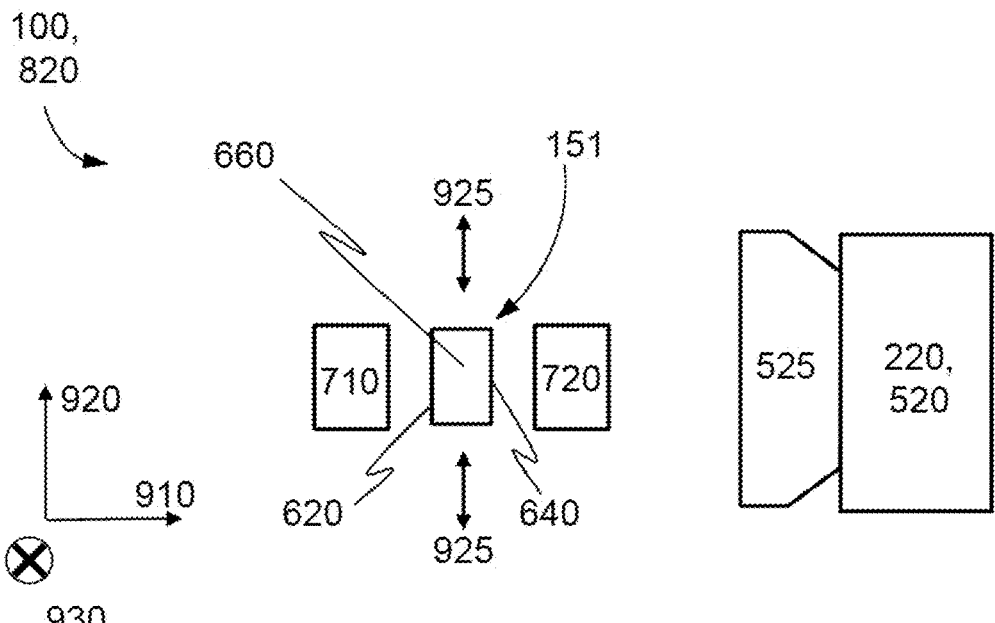
FIG. 2C depicts a further view of the second inspection position.
Figure 3:
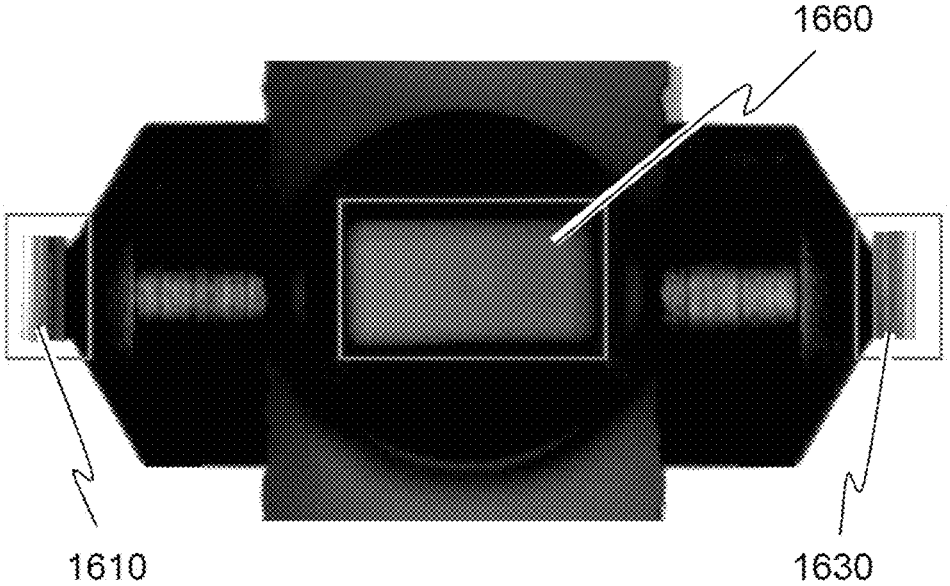
FIG. 3 depicts a sample image taken with the configuration depicted in FIG. 2A, 2B or 2C.

FIG. 3 depicts a sample image taken with the configuration depicted in FIG. 2A, 2B or 2C. On the left and right are two areas 1610, 1630 that are images of sides 610 and 630 (also depicted in FIG. 1C). These are both in focus as they were made using an inspection apparatus configured and arranged to provide the sides 610, 630 of die 150, 151 at substantially equal distances from the first 710 and second 720 optical reflectors. Additionally, in the center is a single area 1660 that is the image of the second (or bottom) face 660 of the die 150, 151. Compared to the images of the sides, this image 1660 not in focus and not evenly illuminated.

The die-inspection apparatus 100 may be configured and arranged to inspect an approximately rectangular die 151 as depicted in FIG. 1C. The rectangular die 151 comprises two shorter sides 610, 630 and two longer sides 620, 640.

FIG. 2C depicts a further view of the second inspection position 820 lying in the plane comprising the first axis 910, having a positive direction from left to right, and the second axis 920, having a positive direction from bottom to top. The third axis 930 has a positive direction going into the page.

This is the same as the view depicted in FIG. 2B except that an approximately rectangular die 151 is inspected at the second inspection position 820. One of the longer sides 620 faces the first optical reflector 710. The other longer side 640 faces the second optical reflector 720.

In the orientation depicted in FIG. 2C, one or more inspection images are then made of at least a portion of the second face 660 and each of two sides 620, 640 of the rectangular die 151.

Figure 2D:
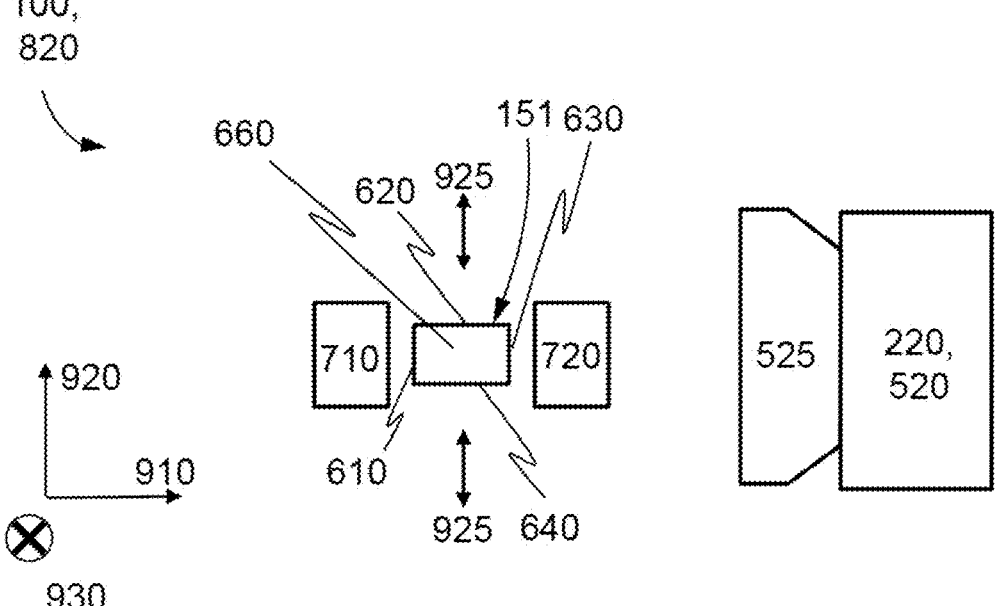
FIG. 2D depicts a further view of the second inspection position.

To complete the inspection at the second inspection position 820, the rectangular die 151 must be rotated ninety degrees. This is depicted in FIG. 2D, which is the same view as FIG. 2C except that the rectangular die 151 has been rotated ninety degrees around the third axis 930. The longer sides 620 and 640 no longer face the first 710 and second 720 optical reflectors. The shorter sides 610, 630 now face, respectively, the first 710 and second 720 optical reflectors.

This example is similar to the embodiment depicted in FIG. 2B—there is sufficient space between the first 710 and second 720 optical reflectors to allow rotation of the rect-angular die 151 without requiring the die 151 to be moved significantly in either the direction 925 of the second axis 920 and/or the direction of the third axes 930.

In general, safe rotation is possible if the distance between the first 710 and second 720 optical reflectors is greater than the largest diagonal dimension of the die 151 in a plane comprising a face 650, 660 of the die 151.

When inspecting rectangular dies 151 using the second image detector 520, there will be three main optical distances from the second image detector 520 to consider for the point of focus. It is assumed that the faces and sides and optical elements in the optical path are optimally aligned and, where appropriate, perpendicular. The main distances are to the second face 660 of the die 150, to the shorter sides 610, 630 of the die 150; and to the longer sides 620, 640 of the die 150.

After completing the inspection process and making images of all six faces/sides, the die may be further inspected, further processed, further handled, the inspection process described above wholly or partially repeated, or any combination thereof.

If the die inspection apparatus 100 is comprised in a device for handling and/or processing dies, such as a die bonder, the die attachment head 130 may move to a further handling and/or processing position carrying the die 150, 151.

The first 710 and second 720 optical reflectors may be considered to provide a channel or passage, oriented approximately parallel to the second axis 920—it may therefore be advantageous to configure and arrange the further handling and/or processing position to be located along the second axes 920 from the second inspection location 820. This may avoid one or more additional moves along the third axis 930, which may reduce throughput.

Figure 4A:
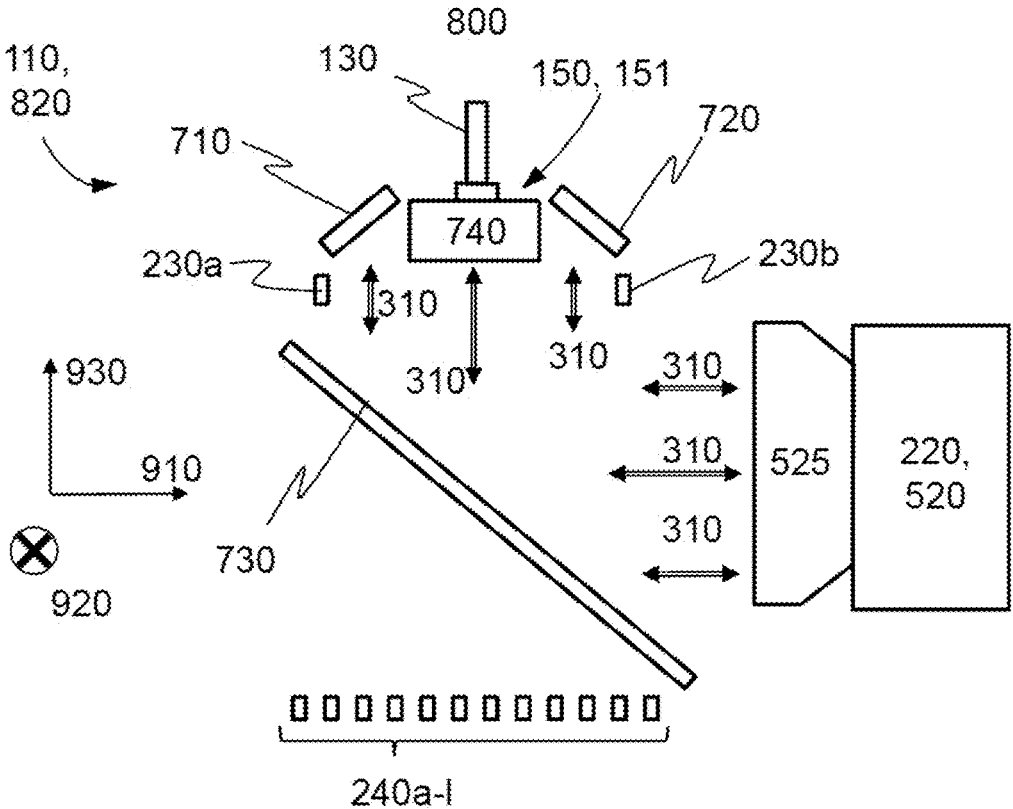
FIGS. 4A and FIG. 4B depict a second inspection position comprised in a further component inspection apparatus.
Figure 4B:
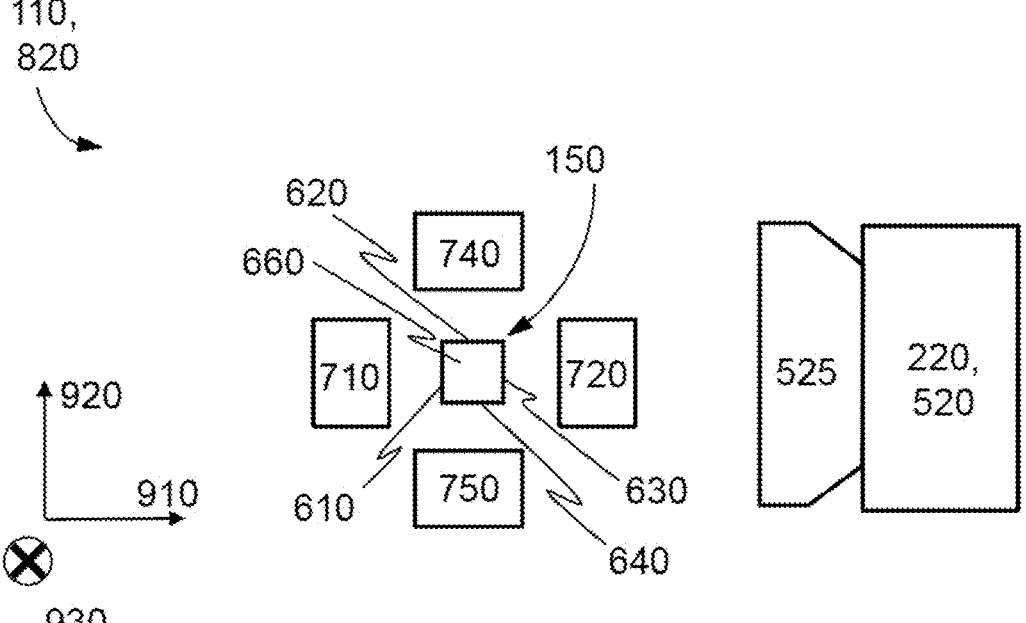

FIG. 4A and FIG. 4B depict a second inspection position 820 comprised in a further die inspection apparatus 110.

FIGS. 4A and 4B are the same as FIG. 2A and FIG. 2B except that for the further die inspection apparatus 110 comprising a fourth optical reflector 740 and a fifth optical reflector 750. The die 150, 151 is positioned between the first optical reflector 710, the second optical reflector 720, the fourth optical reflector 740, the fifth optical reflector 750, whereby the two opposite sides 610, 630 are positioned to be facing, respectively, the first 710 and second 720 optical reflectors and two other opposite sides 620, 640 are posi-tioned to be facing, respectively, the fourth 740 and fifth 750 optical reflectors. Additionally, the die 150, 151 is not depicted in FIG. 4A—it is behind by the fourth optical reflector 740.

The further die inspection apparatus 110 is the same as the die inspection apparatus 100, except for the first 710, second 720, fourth 740 and fifth 750 optical reflectors may be considered to provide a box instead of a channel. Further, movement of the die 150, 151 into or out of the second inspection position requires a degree of movement along the third axes 930 to avoid possible collision between the die 150, 151 and one or more optical reflectors 710, 720, 740, 750; and one or more inspection images may be made of at least a portion of the second face 660 and each of four sides 610, 620, 630, 640 of the die 150, 151.

Although a square die 150 is depicted in FIG. 4B, the optical reflector box 710, 720, 740, 750 may be configured and arranged to provide sufficient space for a rectangular die 150. Alternatively, the optical reflector box may be modified to provide a rectangular-shaped optical reflector box 710, 720, 740, 750.

The further die-inspection apparatus 110 may therefore be configured and arranged to provide a similar or even a higher throughput as the embodiments described in relation to the die-inspection apparatus 510 because no further movement is required to make images of all the faces and sides.

In known system that use reflective elements, such as mirrors, to image the sides, the focus used is often a compromise between focus on the bottom face of the die and the sides, where the user is forced to accept at least one degraded image.

Depending on the degree of deviation from a square die, it may be advantageous to modify one or more focus parameters to optimize the image focus of the sides as imaged by the die inspection apparatus described herein. For example, by one or more of the following like:

(A): a the second image detector 520 comprising an adjustable objective 525, also described as an adjust-able optical element 525, configured and arranged to adapt the focal length of the adjustable optical element 525 to the distance from the optical element 525 to the die face or the side under inspection. For a lens with non-negligible thickness, the focal length may be con-sidered to be the distance from the focal plane to the vertex of the front optical surface of the optical element 525. The range of the focal length required depends on the configuration and arrangement of one or more elements in the apparatus, such as one or more optical paths, the type of adjustable optical element, and the design of the adjustable optical element. For example, a range of possible focal lengths (or a z-range) may be approximately 22 mm, with a minimum working dis-tance of approximately 54 mm and a maximum work-ing distance of approximately 77 mm. And/or like to configure and arrange the second image detector 520 to be movable in the direction of the first axis 910, whereby the optical path length between the second image detector 520 and the die 150, 151 is increased or decreased, depending on the face or side being imaged;

(B): configure and arrange the adjustable optical element 525 to be movable in the direction of the first axis 910, whereby the optical path length between the adjustable optical element 525 and the die 150, 151 is increased or decreased, depending on the face or side being imaged;

(C): configure and arrange the first optical reflector 710 and/or the second optical reflector 720 to be movable in the direction of the first axis 910, whereby the optical path length is increased or decreased, depending on the side being imaged. In use, the first optical reflector 710 may be positioned opposing the first 620 or second side 620 side. In use, the second optical reflector 720 may be positioned opposing the third side 630 or fourth 640 side;

(D): configure and arrange the fourth optical reflector 740 and/or the fifth optical reflector 750 to be movable in the direction of the second axis 920, whereby the optical path length is increased or decreased, depending on the side being imaged;

or any combination of (A), (B), (C) or (D).

Preferably, one or more suitable motors are provided whereby the control software can set the position of each.

The range of movement may be predetermined and/or controlled to compensate for possible different lengths of the sides of the die. For a rectangular die, three focus positions may be needed. It may be advantageous to provide a movement range of approx. 20 to 30 mm for one or more of the movable elements.

For example, a liquid lens may be provided as an adjustable optical element 525—the shape of the lens may be controlled electrically, and the shape determines the focal length of the optical element 525. For example, refocusing with a liquid lens may take only tens of milliseconds, which is typically quicker than any complex mechanical die movement can be performed. Focusing time of approx. 20 ms are possible.

Suitable liquid lenses may include a "Tunable acoustic gradient index of refraction" (TAG) lens. These are adaptive optics devices filled with a fluid and driven by an acoustic wave. The fast refractive index change induced results in a lens with tunable focal length at kHz rates, with applications in imaging and beam shaping.

Research articles by the Arnold Group at Princeton University can be found at: spikelab.mycpanel.princeton.edu/research/TAG_lens.html.

Suitable liquid lenses may include an Optotune focus tunable lens. These are shape-changing lenses based on thin polymer film technology and high-performance optical fluids. They may be manually or electrically actuated. The transmission range is, for example 240 to 2500 nm. The operating temperature range is, for example: −40° C. to +85° C. and beyond. More details and specifications can be found at: www.optotune.com/focus-tunable-lenses. For example:

www.corning.com/emea/de/innovation/co-rning-emerging-innovations/corning-varioptic-lenses/variable-focus-lenses-a-series.html So, in summary an inspection apparatus is provided that allows high-speed image detection, suitable for inline use. Up to five faces and sides may be accurately and quickly imaged by a single image detector at a single inspection position. The sixth face/side may be inspected just before attachment to the die attachment head.

Comparable known systems require up to five additional imaging systems to be provided, each comprising an image detector, an objective and a coaxial illumination, which is more expensive and difficult to calibrate.

The dimensions of the dies 150, 151, which may be inspected with the inspection system as described in this disclosure, depends on one or more characteristics, including:

1. The field of view (FOV) of the objective comprised in the second image detector 520. For example, the field of view of a liquid lens objective. Preferably, the FOV is predetermined and/or controlled to include the combined size of the die second face 560, and two or four die sides 610, 620, 630, 640. For the currently available objectives with liquid lens, the object circle diameter can be several tens of millimetres. In the inspection apparatus described in this disclosure, the object circle diameter may be any suitable size. For example, approximately 21 mm or approximately 42 mm.

2. The available working range of the objective comprised in the second image detector 520. For example, the working range of a liquid lens objective. A shorter working distance may be used to inspect the second face 560 of the die. Longer working distances may be required to inspect the sides. Currently, liquid lenses are available, with z-ranges of up to 350 mm. In the inspection apparatus described in this disclosure, the z-range is estimated to be approximately 18 mm.

3. The dimensions of the optical reflector box 710, 720, 740, 750 depicted in FIGS. 4A and 4B. The optical

| Product description | Clear aperture (mm) | Size Ø × H (mm) | Lens type | Optical power range (dpt) | Refractive index |
|---|---|---|---|---|---|
| Electrically tunable lens | 3 | 10 × 4.0 | Plano convex to plano concave | −13 to +13 | 1.300 |
| Electrically tunable lens | 10 | 30 × 9.7 | Plano convex | +8.3 to +20 | 1.300 |
| Electrically tunable lens | 10 | 30 × 20.7 | Plano convex (offset lens optional) | +5 to +10 −1.5 to +3.5 | 1.300 |
| Electrically tunable lens | 10 | 42 × 41 | Plano convex + plano concave offset lens with optical feedback (OF) | −2 to +2 | 1.300 |
| Electrically tunable lens | 16 | 40 × 11.9 | Plano convex to plano concave | −2 to +3 | 1.300 |
| Manually tunable lens | 20 | 37 × 13.2 | Plano convex to plano concave | −18 to +18 | 1.38 |

Suitable liquid lenses may also include a Corning Varioptic lens. These rely on the electrowetting principle where the interface of two liquids is modified when a voltage is applied. This eliminates moving parts, enabling faster focussing. These lenses may be used in industrial applications that require robust, accurate, fast, and long-lasting lenses. More details and specifications can be found at:

reflectors are preferably extended enough to image a complete side on the sensor. In the inspection apparatus described in this disclosure, sides with dimensions up to 3.29×22.56 mm2 may be inspected.

Additionally, the spacing between the optical reflectors is preferably at least as big as the width of the die 150, 151. For the optical reflector box 710, 720, 740, 750 depicted in FIG.

4A to 4B, the speed of the completed inspection may be increased, by configuring the spacing between the optical reflectors 710, 720, 740, 750 to be at least as large as the diagonal of the die 150, 151. This enables a rotation of the die 150, 151 around the third axis 930 without moving the die 150, 151 out of the optical reflector box.

In the inspection apparatus described in this disclosure, the spacing between the optical reflectors 710, 720, 740, 750 is estimated to be approximately 9 mm.

In practice, a minimum tolerance may be predetermined and/or controlled between the edges of the die 150, 151 and the optical reflectors 710, 720, 740, 750—for example, a minimum tolerance of approximately 0.5 mm. This may also be described as a clearance. Any suitable tolerance may be used—it is predetermined and/or controlled to compensate for inaccuracies during operation, including placements inaccuracies, deviations in die 150, 151 size and/or positions on the wafer. If the sizes of the dies 150, 151 are very constant and/or position accuracy is relatively high, the minimum tolerance used may be reduced.

An analysis of the limiting times of a bond process including a 6-side inspection was performed (Link). For the optical reflector box 710, 720, 740, 750 depicted in FIGS. 4A and 4Bf, the cycle time for a complete pick-and bond process is estimated to be between 360 ms and 490 ms, depending on the dimensions of the die 150, 151 and the position of the die 150, 151 on the wafer. In comparison, any time to adjust the focus of the objective with a liquid lens is estimated to contribute approximately 20 ms for each refocusing step.

Although described above as being inspections at a first and second inspection position, the skilled person will realise that these orders could be reversed. For example, after the inspection in a second position, the die may be transported to a first position where the top face of the die is at least partially inspected, or the die is released within the imaging range of an image detector. Additionally, or alternatively, an inspection of the top face of the die may be performed before bonding or after.

In addition, the skilled person will realise that the positions of components depicted in the figures are only examples and not to scale. Additionally, or alternatively, the positions of one or more components may be interchanged in the case that the optical relationships remain the same. For example, in FIG. 2A, the position of the fourth 240 light source and the position of the second image detector 520 may be interchanged.

The skilled person will also realize that the embodiments described in this disclosure operating with a square or rectangular die may be configured and arranged to operate with dies having very different planar shapes and different number of sides, including triangular, pentagonal, hexagonal, heptagonal, octagonal, nonagonal, decagonal, or any polygonal shape in general. Nominal rotations applied around the third (or Z axis) to move between sides for imaging are mainly determined by the planar shape of the die, and in particular, the number of a sides.

Similarly, the embodiments may be configured and arranged to operate with dies having a plurality of faces, such as six faces and/or cube shapes and/or approximate cube shapes. The main technical difference between a face and a side are the relative dimensions, and the possibility that a side may be less planar due to cutting or other processing actions.

The die inspection apparatus described above may be implemented as a stand-alone inspection device. One or more functions of the die inspection apparatus may be implemented in a device configured and arranged for handling and/or processing dies, such as a die bonder.

The die inspection apparatus may be wholly or partially integrated into the design of such a die handler/processor, or an existing die handler/processor may be upgraded by integrating one or more functions. The skilled person may further optimise the die inspection apparatus using the instructions provided elsewhere in this disclosure to minimise any loss in throughput.

As described above, optical path length may be further modified by providing movement of one or more optical elements, together with adapting the focal length using the adjustable optical element. However, it may also be advantageous to use one or more of these movements instead of adapting the focal length using the adjustable optical element.

In other words: An apparatus (100, 110) for inspection of a die (150, 151), wherein the die (150, 151) comprises a first face (650) and an opposite second face (660); a first side (610) and an adjacent second side (620); and a third side (630) and an adjacent fourth side (640); wherein the first side (610) and third side (630) are opposite, the second side (620) and fourth side (640) are opposite, and each side (610, 620, 630, 640) is adjacent to the first (650) and second (660) faces; wherein the apparatus (100) comprises a further light source (220), configured and arranged to provide, in use, a direct illumination beam (310) and to direct at least a portion of the direct illumination beam (310) towards the second face (660), a first optical reflector (710) and a second optical reflector (720); wherein the first optical reflector (710) is configured and arranged to direct, in use, a portion of the direct illumination beam (310) towards the first side (610); to receive at least a portion of the illumination beam reflected and/or scattered back from the first side (610); and to direct at least a portion of the reflected and/or scattered illumination beam towards a second image detector (520), wherein the second image detector (520) is configured and arranged to image at least a portion of the first side (610); wherein the second optical reflector (720) is configured and arranged to direct, in use, a portion of the direct illumination beam (310) towards the third side (630); to receive at least a portion of the illumination beam reflected and/or scattered back from the third side (630); and to direct at least a portion of the reflected illumination beam towards the second image detector (520), wherein the second image detector (520) is further configured and arranged to image at least a portion of the third side (630); wherein the second image detector (520) is configured and arranged to image: at least a portion of the second face (660); at least a portion of the first side (610); and at least a portion of the third side (630); the apparatus 100, 110 further comprising one or more optical elements, configured and arranged to be movable, whereby an optical path length to the die 150, 151 is increased or decreased.

Movable optical elements may include the second image detector 520 is configured and arranged to be movable, whereby the optical path length between the second image detector 520 and the die 150, 151 is increased or decreased; or the adjustable optical element 525 is configured and arranged to be movable, whereby the optical path length between the adjustable optical element 525 and the die 150, 151 is increased or decreased; or the first optical reflector 710 is configured and arranged to be movable, whereby the optical path length between the second image detector 520 and the first side 610 and/or second side 620 is increased or decreased; or the second optical reflector 720 is configured and arranged to be movable, whereby the optical path length between the second image detector 520 and the third side 630 and/or fourth side 640 is increased or decreased; or any combination thereof.

Figure 6A:
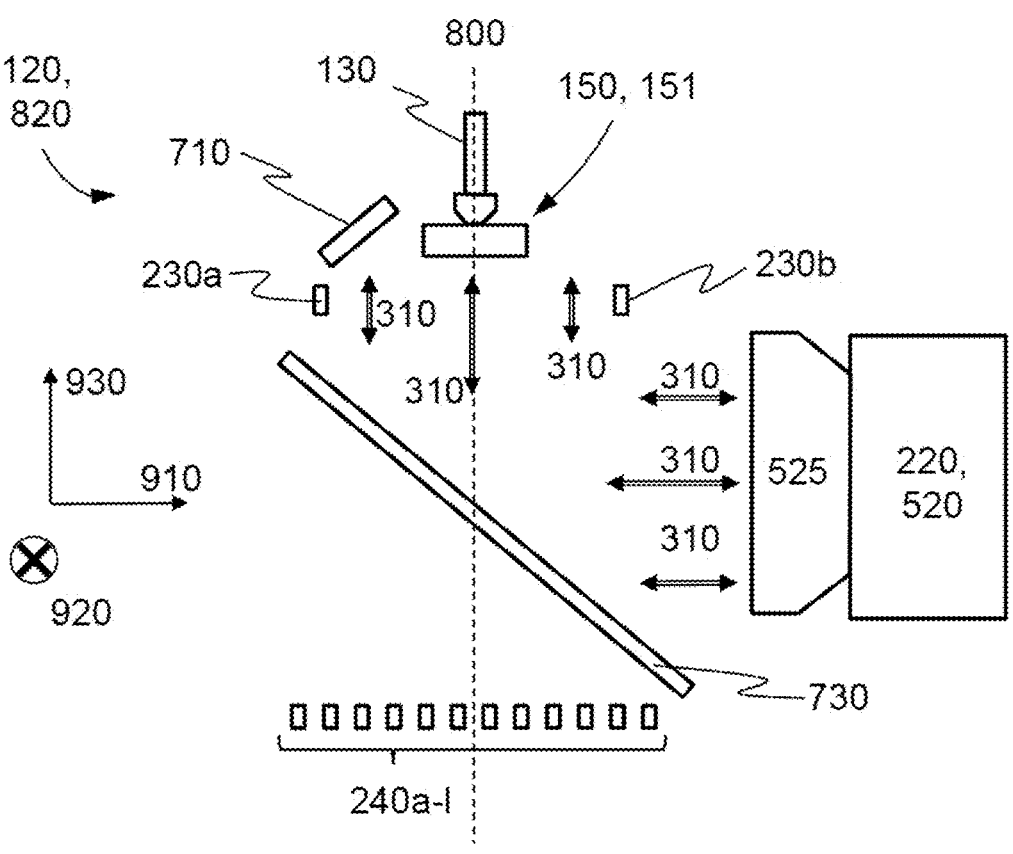
FIGS. 6A and FIG. 6B depict a second inspection position 820 comprised in a still further die inspection apparatus 120.
Figure 6B:
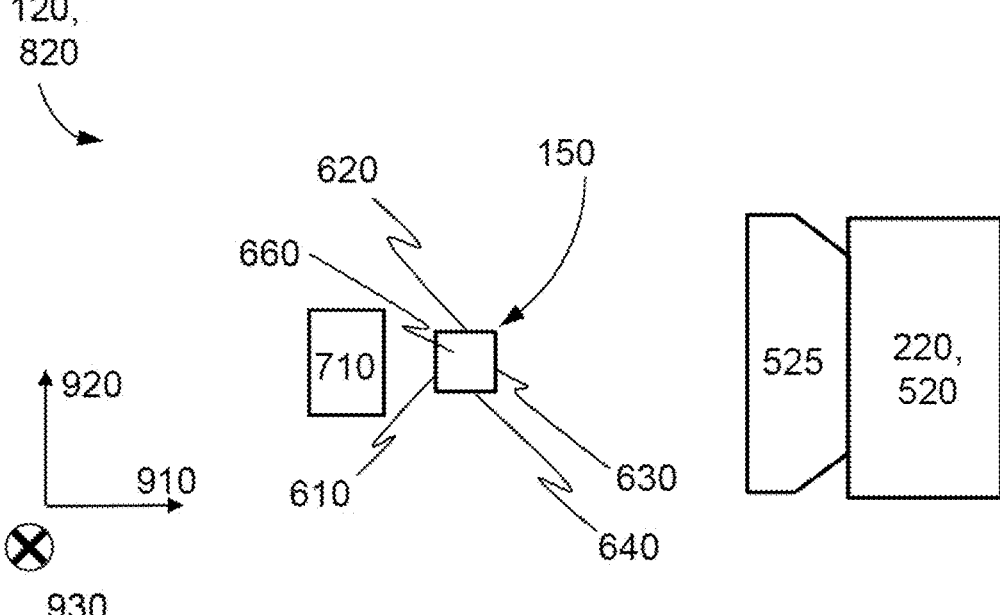

FIG. 6A and FIG. 6B depict a second inspection position 820 comprised in a still further die inspection apparatus 120.

FIGS. 6A and 6B are the same as FIG. 4A and FIG. 4B except for the still further die inspection apparatus 120 comprising a first optical reflector 710. The still further die inspection apparatus 120 does comprise a second optical reflector 720, a third optical reflector 730 or a fourth optical reflector 740. The die 150, 151 is positioned adjacent the first optical reflector 710, whereby the first side 610 is positioned to be facing the first optical reflector 710. The movement of the die 150, 151 into or out of the second inspection position may require a degree of movement along the third axes 930 to avoid possible collision between the die 150, 151 and one or more optical reflectors 710. One or more inspection images may be made of at least a portion of the second face 660 and each of the four sides 610, 620, 630, 640 of the die 150, 151.

Figure 7A:
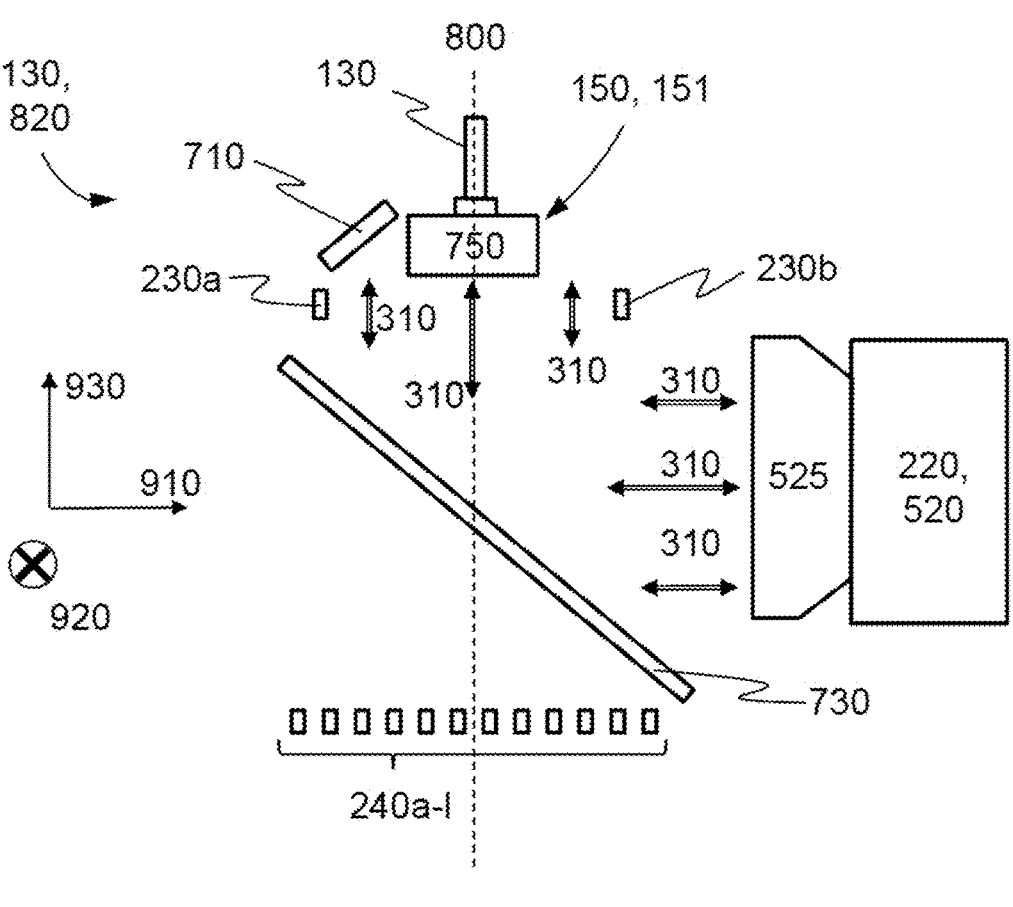
FIGS. 7A and 7B show other schematic views of a second inspection position comprised within the die inspection apparatus 130.
Figure 7B:
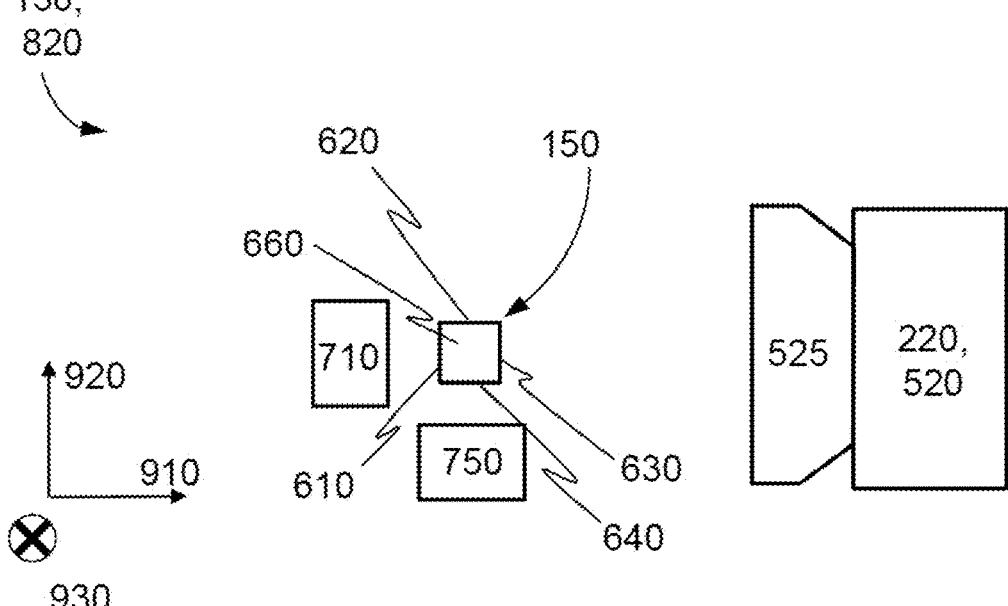

FIGS. 7A and 7B are the same as FIG. 4A and FIG. 4B except for the yet further die inspection apparatus 130 comprising a first optical reflector 710 and a fifth optical reflector 750. The die 150, 151 is positioned adjacent to the first optical reflector 710 and the fifth optical reflector 750, whereby the two adjacent sides 610, 640 are positioned to be facing, respectively, the first 740 and fifth 750 optical reflectors. The movement of the die 150, 151 into or out of the second inspection position may require a degree of movement along the third axes 930 to avoid possible collision between the die 150, 151 and one or more optical reflectors 710, 750. One or more inspection images may be made of at least a portion of the second face 660 and each of four sides 610, 620, 630, 640 of the die 150, 151.

| List of References | |
| --- | --- |
| 100 | die-inspection apparatus |
| 110 | die-inspection apparatus |
| 130 | die attachment head |
| 150 | die as a component |
| 151 | die as a component |
| 210 | first light source |
| 220 | second light source |
| 230a, b | third light source |
| 240a-f | fourth light source |
| 310 | first illumination beam |
| 510 | first image detector |
| 520 | second image detector |
| 525 | adjustable optical element |
| 610 | first die side |
| 620 | second die side |
| 630 | third die side |
| 640 | fourth die side |
| 650 | first die face (top) |
| 660 | second die face (bottom) |
| 700 | optical axis |
| 710 | first optical reflector |
| 720 | second optical reflector |
| 730 | third optical reflector |
| 740 | fourth optical reflector |
| 750 | fifth optical reflector |
| 800 | optical axis |
| 810 | first inspection position |
| 820 | second inspection position |
| 830a | second plane comprising a portion of light from a third light source 230a |
| 830b | third plane comprising a portion of light from a third light source 230b |
| 840a | fourth plane comprising a |

-continued

| List of References | |
| --- | --- |
| | portion of light from a fourth light source 240a |
| 840f | fifth plane comprising a portion of light from a fourth light source 240b |
| 850a | sixth plane comprising a portion of light from a first light source 220 |
| 850b | seventh plane comprising a portion of light from a first light source 220 |
| 860 | first plane comprising a second face |
| 910 | first axis (X) |
| 915 | movement along first axis (X) |
| 920 | second axis (Y) |
| 925 | movement along second axis (Y) |
| 930 | third axis (Z) |
| 935 | movement along third axis (z) |
| 1610 | first image of a side |
| 1630 | second image of a side |
| 1660 | third image of a face |

The invention claimed is:

1. An apparatus (100, 110) for inspection of a component (150, 151), wherein the component (150, 151) comprises:

a first face (650) and an opposite second face (660);

a first side (610) and an adjacent second side (620);

a third side (630) and an adjacent fourth side (640);

wherein the first side (610) and third side (630) are opposite to each other, the second side (620) and fourth side (640) are opposite to each other, and each side (610, 620, 630, 640) is adjacent to the first (650) and second (660) faces;

wherein the apparatus (100) comprises a light source (220), configured and arranged to provide, in use, a illumination beam (310) and to direct at least a portion of the illumination beam (310) towards the second face (660), a first optical reflector (710) and a second optical reflector (720);

wherein the first optical reflector (710) is configured and arranged to direct, in use, a portion of the illumination beam (310) towards the first side (610); to receive at least a portion of the illumination beam reflected and/or scattered back from the first side (610);

and to direct at least a portion of the reflected and/or scattered illumination beam towards a second image detector (520), wherein the second image detector (520) is configured and arranged to image at least a portion of the first side (610);

wherein the second optical reflector (720) is configured and arranged to direct, in use, a portion of the illumination beam (310) towards the third side (630); to receive at least a portion of the illumination beam reflected and/or scattered back from the third side (630);

and to direct at least a portion of the reflected and/or scattered illumination beam towards the second image detector (520), wherein the second image detector (520) is further configured and arranged to image at least a portion of the third side (630);

wherein the second image detector (520) is configured and arranged to image at least a portion of the second face (660); and/or or at least a portion of the first side (610); and/or at least a portion of the third side (630);

the apparatus (100, 110) being further configured and arranged to modify, in use, one or more optical paths to the component (150, 151), and wherein the apparatus (100, 110) comprises at least one selected from the group consisting of configurations (I)-(V):

(I) the second image detector (520) further comprises an adjustable optical element (525), configured and arranged: to adapt the focal length of the optical element (525) to the distance from the optical element (525) to the second face (660); and to adapt the focal length of the optical element (525) to the distance from the optical element (525) to the first side (610) and to the third side (630);

(II) the apparatus (100, 110) is further configured and arranged to rotate the component (150, 151) or the two optical reflectors (710, 720) whereby the two opposite sides (610, 630, 620, 640) change from a first pair of opposite sides (610, 630) facing respectively the first (710) and second (720) optical reflectors, to a further pair of opposite sides (620, 640) facing respectively the first (710) and second (720) optical reflectors;

(III) the apparatus (100, 110) further comprises one or more in further light sources (230a, 230b), configured and arranged to provide indirect illumination of the second face (660);

wherein the second face (660) is comprised in a first plane (860);

wherein a second plane (830a, 830b) intersects with the optical axis (800), the first plane (860) and the one or more in further light sources (230a, 230b);

whereby, during use, at least a portion of light from the one or more in further light sources (230a, 230b) passes along the second plane (830a, 830b) to intersect the second face (600);

wherein an angle in longitudinal cross-section between the first plane (860) and the second plane (830a, 830b) is 45 degrees or less;

(IV) the apparatus (100, 110) further comprises one or more tilt compensation light sources (240a-f), configured and arranged to provide tilt compensation illumination of the first side (610);

wherein a third plane (840a, 840b) intersects with the first side (610), and the one or more tilt compensation light sources (240a-f);

whereby, during use, at least a portion of light from the one or more tilt compensation light sources (240a-f) passes along the third plane (840a, 840b) to intersect the first side (610);

wherein, during use, at least a portion of light from the further light source (220) passes along a fourth plane (850a, 850b) to intersect the first side (610); and (V) the second image detector (520) is configured and arranged to be movable, whereby the optical path length between the second image detector (520) and the component (150, 151) is increased or decreased; or the adjustable optical element (525) is configured and arranged to be movable, whereby the optical path length between the adjustable optical element (525) and the component (150, 151) is increased or decreased; or the first optical reflector (710) is configured and arranged to be movable, whereby the optical path length between the second image detector (520) and the first side (610) and/or second side (620) is increased or decreased; or the second optical reflector (720) is configured and arranged to be movable, whereby the optical path length between the second image detector (520) and the third side (630) and/or fourth side (640) is increased or decreased; or any combination thereof.

2. The apparatus according to claim 1, wherein the apparatus (100, 110) is further configured and arranged to increase and/or decrease, in use, an optical path length to the component (150, 151).

3. The apparatus according to according to claim 2, wherein the apparatus (110) wherein the further light source (220) is further configured and arranged to direct, in use, at least a portion of the direct illumination beam (310) towards a fourth optical reflector (740) and a fifth optical reflector (750); wherein the fourth optical reflector (740) is configured and arranged to direct, in use, a portion of the direct illumination beam (310) towards the second side (620); and to receive at least a portion of the illumination beam reflected back from the second side (620); and to direct at least a portion of the reflected illumination beam towards the second image detector (520), wherein the second image detector (520) is further configured and arranged to image at least a portion of the second side (620);

wherein the fifth optical reflector (750) is configured and arranged to direct, in use, a portion of the direct illumination beam (310) towards the fourth side (640); to receive at least a portion of the illumination beam reflected back from the fourth side (640); and to direct at least a portion of the reflected illumination beam towards the second image detector (520), wherein the second image detector (520) is further configured and arranged to image at least a portion of the fourth side (640);

wherein the second image detector (520) is further configured and arranged to image: at least a portion of the second side (620) and at least a portion of the fourth side (640);

wherein the adjustable optical element (525) is further configured and arranged: to adapt the focal length of the adjustable optical element (525) to the distance from the optical element (525) to the second (620) and to the fourth side (640).

4. The apparatus according to claim 1, wherein the second image detector (520) further comprises an adjustable optical element (525), configured and arranged: to adapt the focal length of the optical element (525) to the distance from the optical element (525) to the second face (660); and to adapt the focal length of the optical element (525) to the distance from the optical element (525) to the first side (610) and to the third side (630).

5. The apparatus according to claim 4, wherein the adjustable optical element (525) is a liquid lens or an electrically tunable lens or a manually tunable lens.

6. The apparatus according to claim 1, wherein the second image detector (520) is configured and arranged to produce an orthographic image of:

at least a portion of the second face (660);

at least a portion of the first side (610);

at least a portion of the third side (630); or any combination thereof.

7. The apparatus according to claim 1, wherein the apparatus (100, 110) further comprises a third optical reflector (730) configured and arranged to receive, in use, at least a portion of the direct illumination beam (310) from the further light source (220); to direct at least a portion of the direct illumination beam (310) towards the second face (660), the first optical reflector (710) and the second optical reflector (720).

8. The apparatus according to claim 1, wherein the apparatus (100, 110) is further configured and arranged to rotate the component (150, 151) or the two optical reflectors (710, 720) whereby the two opposite sides (610, 630, 620, 640) change from a first pair of opposite sides (610, 630) facing respectively the first (710) and second (720) optical reflectors, to a further pair of opposite sides (620, 640) facing respectively the first (710) and second (720) optical reflectors.

9. The apparatus according to claim 8, wherein the apparatus (100, 110) is further configured and arranged to move the component (150, 151) away from the first (710) and second (720) optical reflectors before rotation of the component (150, 151); and to move the component (150, 151) towards the first (710) and second (720) optical reflectors after rotation of the component (150, 151).

10. The apparatus according to claim 1, wherein the second face (660) is a bottom face.

11. The apparatus according to claim 1, wherein the component (150, 151) to be inspected has an approximately square, an approximately rectangular, an approximately hexagonal or an approximately polygonal longitudinal component cross-section.

12. The apparatus according to claim 1, wherein the apparatus (100, 110) further comprises one or more in further light sources (230*a*, 230*b*), configured and arranged to provide indirect illumination of the second face (660);

wherein the second face (660) is comprised in a first plane (860);

wherein a second plane (830*a*, 830*b*) intersects with the optical axis (800), the first plane (860) and the one or more in further light sources (230*a*, 230*b*);

whereby, during use, at least a portion of light from the one or more in further light sources (230*a*, 230*b*) passes along the second plane (830*a*, 830*b*) to intersect the second face (600);

wherein an angle in longitudinal cross-section between the first plane (860) and the second plane (830*a*, 830*b*) is 45 degrees or less.

13. The apparatus according to claim 12, wherein the angle in longitudinal cross-section between the first plane (860) and the second plane (830*a*, 830*b*) is in the range 20 to 45 degrees.

14. The apparatus according to claim 1, wherein the apparatus (100, 110) further comprises one or more tilt compensation light sources (240*a-f*), configured and arranged to provide tilt compensation illumination of the first side (610);

wherein a third plane (840*a*, 840*b*) intersects with the first side (610), and the one or more tilt compensation light sources (240*a-f*);

whereby, during use, at least a portion of light from the one or more tilt compensation light sources (240*a-f*) passes along the third plane (840*a*, 840*b*) to intersect the first side (610);

wherein, during use, at least a portion of light from the further light source (220) passes along a fourth plane (850*a*, 850*b*) to intersect the first side (610).

15. The apparatus according to claim 14, wherein the angle in longitudinal cross-section between the third plane (840*a*, 840*b*) and the fourth plane (850*a*, 850*b*) is in the range−45 to 45 degrees.

16. The apparatus according to claim 1, wherein the second image detector (520) is configured and arranged to be movable, whereby the optical path length between the second image detector (520) and the component (150, 151) is increased or decreased; or the adjustable optical element (525) is configured and arranged to be movable, whereby the optical path length between the adjustable optical element (525) and the component (150, 151) is increased or decreased; or the first optical reflector (710) is configured and arranged to be movable, whereby the optical path length between the second image detector (520) and the first side (610) and/or second side (620) is increased or decreased; or the second optical reflector (720) is configured and arranged to be movable, whereby the optical path length between the second image detector (520) and the third side (630) and/or fourth side (640) is increased or decreased; or any combination thereof.

* * * * *